June 9, 1931. E. S. HENRY 1,809,166
APPARATUS FOR AUTOMATIC WATER SOFTENERS AND CHEMICAL FEEDS THEREFOR
Filed Aug. 20, 1928
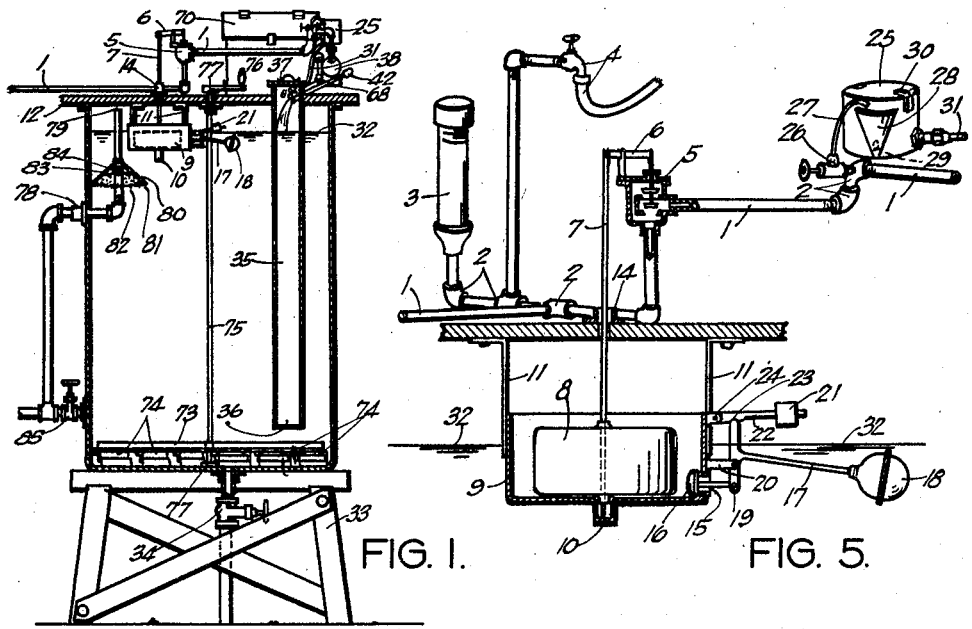
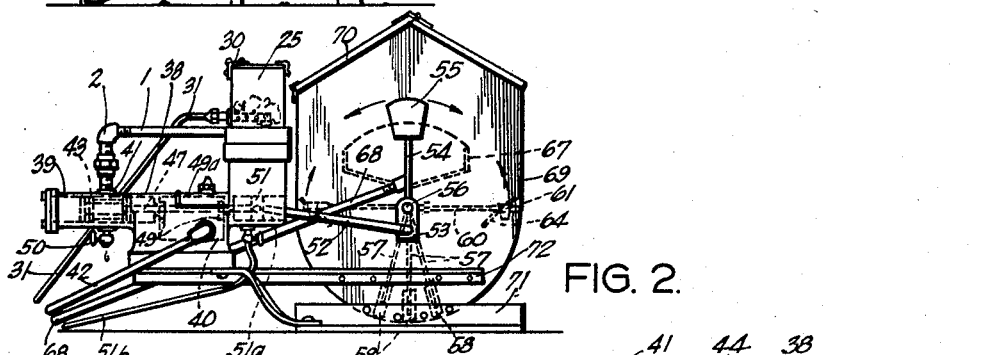
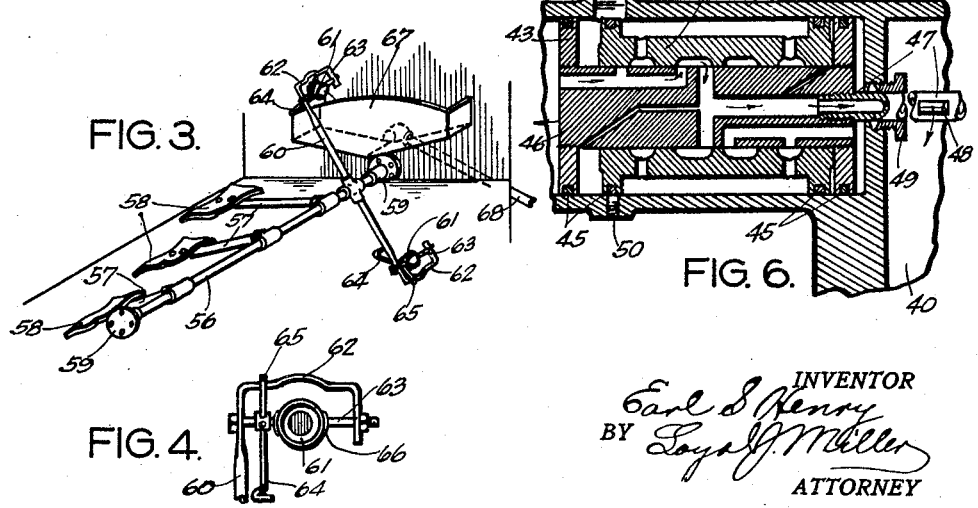
INVENTOR
Earl S. Henry
BY Loyd J. Miller
ATTORNEY Patented June 9, 1931

1,809,166

UNITED STATES PATENT OFFICE

EARL S. HENRY, OF MEDFORD, OKLAHOMA

APPARATUS FOR AUTOMATIC WATER SOFTENERS AND CHEMICAL FEEDS THEREFOR

Application filed August 20, 1928. Serial No. 300,779.

My invention relates to apparatus for measuring and feeding chemicals to measured water and softening said water.

The principal objects of my invention are to provide a device of this character which is new, novel, useful, comparatively inexpensive to construct and operate, automatic in operation, which will be cheaply maintained, and of utility; to provide a machine to maintain at all times a correct proportion between the amount of chemicals fed and the amount of the raw water entering the apparatus by using the hydraulic pressure of the raw feed water acting through a water motor; to automatically measure a definite amount of chemicals for the amount of water carried by each propulsion stroke of the water motor; to utilize the said hydraulic pressure to oscillate properly shaped agitators and maintain a chemical mixture of uniform strength of such chemicals as are only slightly soluble in water; to provide an automatic float control to close the water inlet valve when the surface level of the softened water in the sedimentation tank is near to overflowing, and to open said valve when the level of said water in said tank drops a certain distance; to provide a sweep means in the bottom of the sedimentation tank to facilitate the removal of the sediment or sludge therefrom; to provide a filter on the softened water outlet pipe from said tank; to provide a device which requires a minimum of attention, which an ordinary purchaser can easily erect himself and which can be handled by a totally inexperienced operator; a device which can be made in differing sizes so as to handle a few hundred gallons of water an hour or several million gallons a day; a device which acts with equally beneficial results in softening cold, warm or hot water.

Water softeners as at present constructed require more or less complicated driving mechanism such as electric motors, pulleys, belts, drive chains, switches and reducing gears and some outside source of power. All of this is eliminated in my invention; no outside power is needed as I utilize the hydraulic pressure of the raw feed water as power for operating my improved apparatus. In other words I save the original cost and upkeep of expensive, complicated mechanical equipment and operate my device with power that is now allowed to go to waste.

With these and other objects in view as will more fully appear my invention consists of the construction, novel features, and combination of parts hereinafter more fully described, pointed out in the claims hereto appended, and illustrated in the accompanying one-sheet drawing in which, Figure 1 is a sectional elevational view through the plant; Fig. 2 is an elevational view of the water and chemical device; Fig. 3 is a fragmentary perspective view of the chemical measuring device and agitators; Fig. 4 is a plan view of a measuring cup; Fig. 5 is a fragmentary perspective view of a control mechanism, showing the balanced valve and float housing in section; and Fig. 6 is a fragmentary sectional view of the spool type sleeve valve and its connections.

Like characters of reference designate like parts in all the figures.

I do not wish to be understood as limiting myself to exact details of construction, which may be varied within reasonable limits without departing from the broad principle of my invention or sacrificing any of its advantages.

It is desired the specification and drawings be considered illustrative and not restrictive.

One embodiment of my invention is shown as follows: The raw water from a pump, stand-pipe or like source is conveyed by pipe 1 provided with fittings 2 and an air chamber 3 to avoid water hammer and care for fluctuating pressure, a convenient faucet and hose 4 and a balanced control water inlet valve 5. A fulcrumed lever 6 controls said valve 5 through float rod 7 secured to float 8, operating in float housing 9 having a guide 10 for said rod 7. Supports 11 are means for securing said housing 9 to the cover 12 of sedimentation tank 13, said rod 7 passing through cover 12 and bushing 14 thereon as a guide. As the surface of the water 32 nears the top of the tank 13, the water will overflow into housing 9, automatically raise float 8 and rod 7 which through lever 6 will close valve 5 and stop the flow of raw water in pipe 1. When treated water from tank 13 is withdrawn therefrom until the surface 32 is below housing 9 the unsupported weight of auxiliary float 18 will suddenly withdraw the upward extension of T lever 17 from notch 23 on arm 22 of weight 21 pivoted at 24, said T lever being supportingly hinged at 20 to housing 9 and operatively connected at 19 to valve stem and valve 16. The sudden opening of valve 16 will drain float housing 9 through hole in bushing 15, lower float 8 and through its co-acting connections open valve 5 and start the flow of raw water in pipe 1. Before the water rising in tank 13 reaches bushing 15 float 18 will have closed valve 16 so that valve 5 is undisturbed until the water again overflows into housing 9 and repeats the cycle. To aid in sedimentation a coagulant, preferably alum, is added to the water. I provide tank 25 containing lump coagulant, a valve and connection 26 to fitting 2 on pipe 1, having a small water jet tube 27, visibly pouring a small stream of water into funnel 28 on the side of tank 25. Water passes from funnel 28 through opening 29 into the bottom of tank 25 and dissolves the lump coagulant so that a constant rate of flow of saturated coagulant solution is fed to the water through outlet pipe 31 when the softener is in operation. Valve and connection 26 is inserted in pipe 1 beyond valve 5 so that when the raw water supply stops, valve 5 automatically cuts off the water in jet-tube 27. The quantity of coagulant fed is regulated by the stream through valve 26 and tube 27. Sedimentation tank 13 may be supported by base framework 33 or other means and has a quick opening sludge valve and pipe 34 near the center of the bottom thereof. Downtake mixing cylinder 35, has its lower end 36 open and communicating with tank 13 slightly above the bottom of the said tank 13. The said cylinder 35 extends through and above cover 12 of said tank 13 and is provided with a removable cover 37. As a part of my apparatus I am using what I shall designate as a water motor 38, a standard device originally designed as a steam pump, there being nothing new in its functioning as a steam pump, but in order to operate as a motor utilizing water pressure instead of steam as a motive power, I have enlarged the port openings, substituted bronze piston rings for cast iron rings, for lasting quality, added an oscillating weight and made other changes and additions as will appear as the description progresses. The said water motor 38 comprises a water cylinder 39 a discharge chamber 40, an enlarged intake port 41, and an enlarged discharge port and pipe 42.

The spool type piston 43, having spool type sleeve valve 44, having bronze piston rings 45 instead of the usual cast iron rings, the said rings 45 prevent rusting and sticking when operating in water. The piston body 46, preferably of brass, is threadedly connected with hollow piston rod 47 and is provided with slotted discharge openings 48 emptying into discharge chamber 40, packing nuts 49 on said rod 47 prevent leakage around said rod 47 in passing through said chamber 40. Access to said chamber 40 and nuts 49 is had by means of the removable cover 49a. Raw feed water under hydraulic pressure enters cylinder 39 through intake port 41 from pipe 1 and actuates piston 43. When said piston 43 has reached the limit of its travel to the right as seen in Fig. 6 and starts back to the left, the water in cylinder 39 which caused this movement of piston 43 to the right must escape and cause as little back pressure as possible in order that said piston 43 may perform useful work. This water, which might be called exhaust water from its analogy to exhaust steam, follows the path indicated by the arrows in Fig. 6 through the piston 43, hollow rod 47 and discharge openings 48 into chamber 40 from whence it passes through pipe 42 and into downtake mixing cylinder 35. As can readily be seen water cylinder 39 constitutes a water meter and accurately measures a definite amount of water at each stroke of the piston 43. Drain cock 50 permits draining said cylinder 39 when this is necessary. Connected to said piston rod 47 at the end opposite said piston 43 in what would ordinarily be the pump cylinder when said device is operating by steam, I provide a piston-like cross-head and pin 51 for transmitting power through connecting rod 52 to crank 53. Any water which may leak past packing nut 49 into cross-head chamber 51a is drained out through drain cock and pipe 51b into downtake mixing cylinder 35. Crank 53 actuates oscillating weight arm 54 and weight 55 attached thereto. Said crank 53 and weight arm 54 are attached to agitator shaft 56. Suitably connected to said shaft 56 are agitator arms 57 carrying propeller-shaped paddle agitators 58. Lime is used as the principal chemical in the process of water softening and since lime is only slightly soluble in water it must be thoroughly agitated to overcome the tendency it has to settle to the bottom of the mixer or to form layers of unequal strength. My propeller-shaped paddle agitators 58 insures thorough mixing and circulation of the chemical and produces chemicals of uniform strength in all parts of the mixer. The agitator shaft 56 is journaled in bearings 59 and has suitably connected near its forward end chemical cup arms 60 and chemical cups 61 attached by supporting frame 62 and shaft bolt 63 to said arms 60. Counterbalancing and tripping arm 64 integral with stop arm 65 are adjustably secured to bolt 63 which also carries cup holder 66. Said cups 61 are adapted for measuring and depositing a definite amount of chemicals in collector funnel 67 from whence it passes through pipe 68 to downtake mixing cylinder 35. The mixing is done in semi-cylindrical chemical feed tank 69 having a hinged cover roof 70, angle iron base, 71 for attaching to cover 12 of tank 13 and cantilever angle iron supports 72 for water motor 38.

The functioning of the parts just enumerated will now be explained. As the raw water under pressure passes through and is measured in cylinder 39, power therefrom is transmitted through the co-acting members to oscillate weight 55 which is secured to the forward end of shaft 56 which projects through from the interior of feed tank 69. As the weight 55 reaches the right and left limit of its oscillations, due to its position above the shaft 56, the said weight has a balancing effect on agitator arms 57 and blades 58. The supported frame 62 of cup 61 clears the top of funnel 67 but tripping arm 64 being suspended beneath frame 62 strikes the side of said funnel and the sudden flip to arm 60 throws all of the contents of cup 61 into said funnel 67. While this action is taking place with one cup the other of said cups is being dipped into and beneath the surface of the chemicals in the feed tank 69 which not only positively fills said cup but assists in stirring the chemicals as well. Stop arm 65 contacts frame 62 in such manner that the cup cannot become inverted. As can best be seen in Figs. 2 and 3, agitator arms 57 are attached to shaft 56 so as to occupy planes forming small angles with respect to each other. The propeller shaped blades 58 oscillatingly sweep the bottom of tank 69 and at right and left limits of sweep the end paddles alternately emerge from the surface of the chemicals which materially assists in the agitation. Coagulant pipe 31 carrying a saturated solution from coagulant tank 25, raw water pipe 42 carrying a measured amount of raw water, drain pipe 51b carrying a very small amount of raw water from cross-head chamber 51a and pipe 68 conveying a measured amount of chemicals from feed tank 69 all pour their different loads into the upper end of downtake mixing cylinder 35 where the raw water and said chemicals are thoroughly mixed as they pass downward through said cylinder 35. Precipitation of the objectional dissolved matter in the raw water takes place in downtake 35, the action of the chemicals causing the said matter to separate from the water in the form of sediment or sludge.

The downward motion, and the coagulant, bring the impurities together in relatively large particles so that during the slow upward travel in the main sedimentation tank 13 they will settle to the bottom of said tank. Most of this sediment or sludge thus formed falls to the bottom of tank 13 and must be periodically removed therefrom. This is accomplished by means of the sludge sweep 73 in the bottom of said tank 13, said sweep 73 having short sections of angle irons and pieces of belting 74 attached thereto at an angle so that on rotating said sweep 73 by means of vertical shaft 75 and crank 76 above cover 12 of tank 13, the thick sludge having the consistency of heavy white-wash is swept toward the center of said tank 13, whereby means of quick opening sludge valve and pipe 34 and the pressure of water in said tank the sludge is forced out. The shaft 75 is journaled in bearings 77 at its upper and lower ends. The softened water is drawn off through outlet pipe 78 near the top of tank 13. The upper terminus 79 of said pipe 78 is open above surface 32 of treated water in tank 13. On said pipe 78 below the level of float housing 9 I provide a sand filter 80 consisting of a conical shell 81 having a gauze screen 82 at its large open downwardly extending end, a like screen 83 intermediate screen 82 and the point of said conical shell 81. Between said screens 82 and 83 is a filling of suitable filtering sand through which the softened water must pass before reaching the inlet perforations 84 into pipe 78 above screen 83. This sand filter 80 removes the last traces of sediment and delivers a clean, clear, uniformly softened water. If for any reason it is desired to use water from tank 13 without sand filtering the same, valve outlet 85 near the bottom of the tank permits this.

From this description it will be seen that I provide softener capable of uniform accuracy of treatment, which is automatic and requires a minimum of attention; which operates from hydraulic pressure of the raw feed water and accurately measures said water and the chemicals for softening the same and which eliminates complicated mechanism, motors and power cost of the same. All the parts are so inter-related that the fluctuation or changes in speed of operation can in no way affect the accuracy of chemical feed, as the power from a measured amount of feed water operates the chemical measuring cups at one and the same time. My improved water softener can be built for all capacities from a few hundred gallons per hour up to any amount desired. It does not require housing within buildings but can be installed and will operate on an outdoor tank.

Having thus described my invention what is claimed and desired to be secured by Letters Patent is:

1. A device of the class described, in combination with a sedimentation tank, a float control in said tank for a water supply pipe, a water supply pipe, a coagulant tank and a water motor for measuring a definite amount of water at each stroke and for utilizing the hydraulic pressure of said water as a motive power, of a device of the class described including measuring means for measuring a definite amount of softening materials proportionate to the amount of water supplied with each stroke including a float means therefor, an over center oscillating weight means being adapted for regulating and delivering the proportionate amount of said softening materials and said water to said coagulant tank.

2. The combination of a sedimentation tank, a float control therein for a water supply pipe, a water supply pipe, a coagulating tank for reducing softening materials to a curd-like mass, a water motor for measuring a definite feed of water at each stroke, of a device of the class described, comprising means of utilizing the hydraulic pressure of said water as a motive power, means for measuring a definite amount of softening material proportionate to the amount of water used at each stroke, an over center oscillating weight means being adapted for regulating and delivering the proportionate amount of softening material to the amount of water delivered with each stroke.

EARL S. HENRY.